Dec. 13, 1955   E. G. HOLLMAN ET AL   2,727,083
SILVER PEROXIDE BATTERY AND METHOD OF MAKING
Filed Sept. 26, 1952

INVENTORS.
Edward G. Hollman.
Elliott M. Morse.
James S. Bone.
BY
Wood, Herron & Evans.
ATTORNEYS.

United States Patent Office

2,727,083
Patented Dec. 13, 1955

2,727,083

SILVER PEROXIDE BATTERY AND METHOD OF MAKING

Edward G. Hollman, Elliott M. Morse, and James S. Bone, Joplin, Mo., assignors to The Eagle-Picher Company, Cincinnati, Ohio, a corporation of Ohio Application September 26, 1952, Serial No. 311,752

11 Claims. (Cl. 136—30)

This invention relates to improved batteries which are constituted by silver peroxide zinc electrolytic cells and which may be built for and used as either special purpose primary batteries or rechargeable storage batteries. The general chemical and electrolytic principles of this type of cell have long been known and the theoretical aspects investigated experimentally, but actual service batteries constituted by such cells have not been heretofore available commercially because of the many serious practical difficulties which are involved in the quantity production of sufficiently dependable and uniform silver peroxide zinc batteries. Silver is far more expensive than competitive battery making metals, such as lead, and up to now no commercial battery utilizing a silver peroxide positive electrode has been designed which justified the inherently high cost of the silver and of the exacting process of fabricating it into an efficient positive electrode.

As a matter of theory, the silver peroxide zinc battery may be as much as three times as efficient as a standard lead acid battery, on the basis of electrical power (watt hours) deliver per unit of battery weight, and this favorable power to weight ratio is manifestly desirable for many usages, among which provision of current for airborne electrical equipment may be taken as typical.

The method of preparing silver peroxide plates for experimental cells is stated by Vinal in his Primary Batteries, copyright 1950, as follows:

"The electrodes may be prepared in any one of several different ways. In general the object is to make thin plates as the batteries are usually intended for discharge at high rates. The grid is copper-wire screen, silver or nickel plated, of about 50 by 50 mesh. The active material is applied to this grid as a paste in somewhat the same way that lead storage-battery plates are pasted. The paste is a mixture of silver oxide powder and the amount of water necessary to make it a convenient consistency for application to the grid with a spatula. After one side of the plate has been pasted it is reversed and pasted on the other side. The plates are then dried at about 85° C. In this condition they may be used as silver oxide, $Ag_2O$, but it is more usual to form them to the higher oxide, $Ag_2O_2$.

"The dried plate containing the oxide, $Ag_2O$, is first heated in a muffle furnace at a temperature of about 500° C. for 10 minutes or more, depending on the temperature, to reduce the oxide and to sinter the particles of silver into a coherent mass. At this stage active material is all silver in a finely divided or spongy state. It may be pressed to produce a plate of specified thickness. The silver is formed to the peroxide state electrolytically in a 5 per cent solution of potassium hydroxide. This process is best carried out slowly at a low current density. Sixteen to 20 hours are required to complete the process. Initially the voltage against zinc is about 1.7 volts, but after a short time this increases to slightly over 2 volts. Near the end of the charge there is a further rise to about 2.3 volts and oxygen evolution occurs. The plate at this time contains the peroxide, $Ag_2O_2$, but the efficiency with which it may be used on discharge varies with the conditions under which it was formed."

The use of the silver peroxide electrode, although expensive from the point of view of raw material and fabrication costs, is desirable for use in batteries for at least four reasons: (1) because the electrode is spongy and tends to open up to maintain its initial efficiency as the silver peroxide is reduced to silver; (2) because the silver peroxide electrode is inherently strong physically and does not lose physical strength as the reduction to metallic silver proceeds; (3) because the inherent current yielding value of silver peroxide as a depolarizing material is higher than that of any other known chemical on a weight or volume or molar basis; and (4) because the full current delivery of the battery may be attained within one minute after activation by contacting the electrodes and electrolyte.

However, the relatively great expense of fabricating this superior positive electrode is not warranted if the negative or zinc electrode does not match it in physical strength, in relative lightness and in its yeld of ions. If the negative electrode is inferior to the positive electrode in any of these respects, then the expensive superiority of the positive electrode is offset or wasted.

From the point of view of dependability, the character of the electrode separating means is just as important as the dependability of the electrodes themselves since failure of an electrode separator is just as fatal to the performance of the battery as failure of one of the electrodes. Functionally, the electrode separator must prevent short circuiting through the electrolyte without inhibiting the flow of ions between the electrodes. On primary batteries which discharge at a high rate in a short time, the development of minor intracell short circuiting may not be absolutely fatal to the performance of the battery due to the relatively small loss of current, but on batteries discharging at a lower rate for a longer period, such intracell short circuiting destroys the value of the battery. Also, such intracell short circuits are fatal to the recharging of the battery if it is to be used as a storage battery. The problem of insulating the electrodes of the cell against internal short circuiting without unduly increasing the internal resistance of the cell is one of the specific problems to which the present invention is directed.

The nature of the electrolyte has not heretofore been discussed. Conventionally, the silver peroxide zinc cell uses an aqueous solution of substantially 20 to 50 per cent by weight of caustic potash, a 30 per cent solution being typical. Solutions of other alkali metal hydroxide may be used in place of the caustic potash solution, or an alkali metal alcoholate may be used as the electrolyte. Primarily, the batteries of this invention are designed to be used with a 30 per cent caustic potash solution, and the disclosed physical characteristics of the plates particularly suit them for use with this electrolyte. The principles of electrode fabrication, however, may be varied to suit the electrodes for most efficient operation with an alternative electrolyte if the use of such electrolyte is desirable or necessary to adapt the battery for a particular purpose.

From the point of view of producing a battery which is of the lightest possible weight in relation to generating capacity, the quantity of electrolyte employed in the cells is also a consideration of significance. Obviously, the quantity of electrolyte employed should be the minimum required, so that weight and volume are both conserved. In a silver peroxide zinc battery, no great quantity of electrolyte is required and it is, therefore, convenient and expedient to engage the electrolyte with the electrode plates by holding the electrolyte on a bibulous electrode separator which also provides insulation between the plates in whole or in part. By using relatively thin electrodes, sufficient electrolyte to exhaust their active chemicals may be placed on a pad between them which is not sufficiently thick to unduly elevate the internal resistance of the cell.

Thus, it is possible to fabricate batteries composed of from 6 to 10 individual cells per lineal inch of battery length, the electrodes of the battery being of any desired area. At 1.6 volts potential per cell, this type of fabrication provides substantially 9 to 16 volts per inch of battery length when the cells are connected in series.

It is often desirable further to insulate the cell electrodes to prevent short circuiting and this may be done by using a dielectric membrane in place of or in addition to the bibulous padding. The use of such dielectric membrane in a rechargeable storage battery is almost necessary and the development of a dielectric diaphragm or membrane suitable for this purpose is one of the accomplishments of the present invention.

A better understanding of the nature of the improved silver peroxide batteries to which this invention is directed is provided in the description of the accompanying drawings in which.

Figure 1:
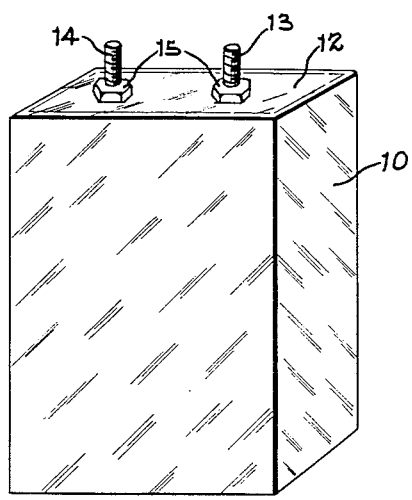
Figure 1 is a perspective view of a silver peroxide zinc cell which utilizes a molded plastic battery case in which two sets of electrodes connected in parallel are removably disposed.
Figure 2:
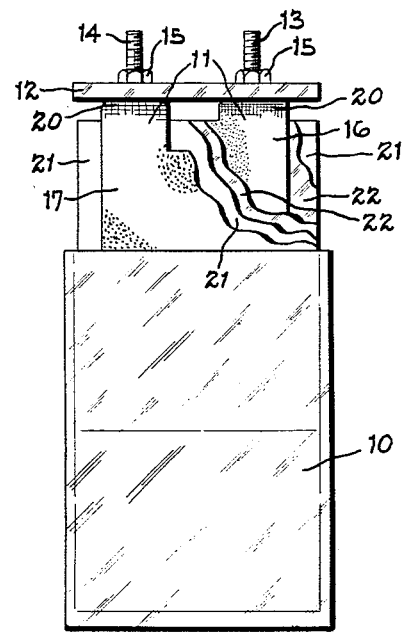
Figure 2 is a side elevational view of the cell of Figure 1 in which the electrodes are partially withdrawn from the battery case and in which the parts comprising the cell are broken away to illustrate their disposition and relationship.
Figure 3:
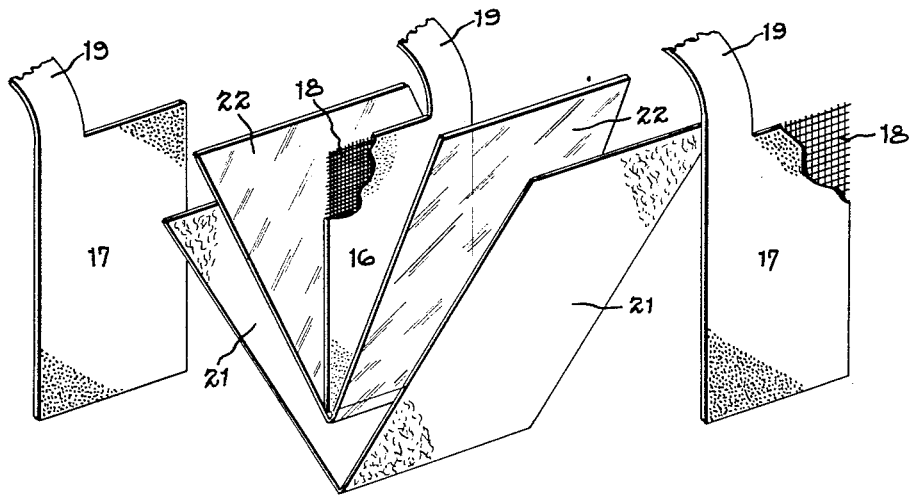
Figure 3 is an exploded view, in perspective, showing two negative plates, a positive plate and their separators, of the cell of Figure 1.

In the battery of Figures 1–3, a pre-molded battery case 10 serves as the container for the cell electrodes 11 and the electrolyte (not shown). The case 10 may be molded of polystyrene or any other plastic material which has the proper physical and chemical properties to constitute a good battery case. The case is provided with a molded top 12, which may be of the same material, through which extend positive terminal 13 and negative terminal 14. These terminals may be fastened in the top 12 by means of nuts 15. On the lower or inner end of each terminal, a plurality of individual electrode plates is attached. As disclosed, the silver peroxide 16 and the zinc 17 which are used as the active electrode materials of the batteries are affixed to screens 18 which are of rectangular shape but provided with upwardly extending tabs 19; the tabs of the positive plates are in alignment to one side of center of the electrodes, the tabs of the negative plates in alignment on the other side of center. The tabs of the screens are not coated with the active chemicals and are attached to the appropriate terminals by means of solder 20. The battery of Figures 1–3 comprises one or more negative plate than positive plates, each positive being disposed between two negatives. By means of this construction, each positive and each negative electrode is soldered directly to its proper terminal and is physically supported by it.

As disclosed in Figure 3, the positive and negative electrodes are separated from each other by disposing two folded slips of separating material over the bottom of each positive electrode to envelope it except for the top edge and the side edges. As disclosed, the outer fold 21 which is in immediate engagement with the negative electrode is more bibulous than the inner fold 22 which is in immediate engagement with the opposite surfaces of the positive electrodes. This relative disposition of the fold is suitable for a battery intended to discharge at a high rate, but for a battery which is intended to discharge at a lesser rate over a much longer period of time, a reversal of the folds is recommended. If desired, three folds may be used instead of the two disclosed in the drawings, with the less bibulous fold in the center. The less bibulous fold is preferably of material of greater dielectric value than the bibulous material and serves the purpose of preventing the formation of short circuits within the cell and, also, makes possible the recharging of batteries of this type.

If desired, unfolded separator sheets may be employed, but the folded separators facilitate the rapid positioning of the separators over the electrodes. If desired, the bottoms of the electrodes may be positioned so close to the bottom of battery case 10 that said bottom holds the separators in proper position between the plates. On the other hand, the bottoms of the electrodes may be spaced from the bottom of the battery case and electrode separators held in proper position between the electrodes by means of pressure from the walls of the plastic case, that is, the plastic case may be made sufficiently narrow in relation to the total thickness of the electrode assembly to impinge sidewise on the electrode assembly, thereby holding the electrodes themselves in properly spaced relationship and holding the folded separators in position between the electrodes. This type of battery is light in weight, easy to assemble, and has the advantage that the case and electrode assemblies are interchangeable so that either may be replaced at any time.

In order to have a battery which has the greatest power delivery for its weight, it is necessary to provide a zinc negative which matches properly with the silver peroxide positive plate both at the commencement of the current discharge and during it, so that the full capacity of each plate is continuously utilized. If a sheet of zinc were used as the negative, then, to match the effective area of the pasted positive, it would have to be many times as large and, hence, the marginal part of the zinc plate would be substantially separated from the positive. Such an arrangement would be wholly unsatisfactory.

In order to have the lowest possible internal resistance and best performance, it is desirable to have the positive and negative plates of substantially the same facial dimensions and to relate the effective internal surface areas to provide continuing electrochemical or ionic equivalency or balance. On this account, it is desirable to use a spongy zinc negative electrode of appropriate effective surface area to match that of the spongy silver peroxide positive.

In making negatives of this type, zinc is electro-deposited upon a wire mesh which may be of any desired fineness and fabricated of any stable metal such as bronze. More particularly, a bronze screen of 16 x 16 mesh is suspended in a slurry of zinc oxide flour in 5 per cent potassium hydroxide solution through which a current is passed at a density of .6 to .7 ampere per square inch of screen surface. The zinc plates out in a spongy mass on the bronze wire but the plating is deposited in an uneven three dimensional tree-like formation. Therefore, after ten to thirty minutes of plating, the negative in process of fabrication is removed from the plating bath and is passed through rollers which compress the tree-like formations of zinc back into and onto the screen to constitute a spongy mass of zinc affixed to the mesh. The squeezing homogenizes the deposited filaments into a denser mass. Ordinary rubber squeeze rollers, such as those used for washing machine rollers, may be employed for this purpose, after which the electrode is returned to the plating bath for further deposition of zinc upon it.

The plating and squeezing is continued until a predetermined weight of zinc is deposited upon the plate, and this may require anywhere from three to ten separate plating and squeezing operations. The result is a spongy mass of zinc of predetermined weight which has appropriate value from the point of view of chemical activity for the silver peroxide value of the positive plate. In other words, when a battery discharges, the material of either the positive or the negative may be first exhausted. The amount of zinc incorporated in the negative is chosen to have the desired relationship to this consideration. For oneshot or primary batteries, the calculation should be so made that waste of the relatively expensive silver is not unnecessarily involved. On the other hand, if the battery is a rechargeable battery, enough zinc should remain after the silver peroxide is reduced to silver to constitute a metallic framework or skeleton for the redeposition of zinc in the recharging process. In this regard, it is to be noted that the slurry of the zinc oxide powder in aqueous potassium hydroxide solution brings together the same chemicals that are formed as the battery discharges and, hence, it may be said that the zinc negative is originally formed from the general type of solution that is inherently developed in the recharging process.

After the required amount of zinc has been deposited on the negative electrode and pressed into a spongy mass, the electrode is thoroughly washed with water to remove the chemicals of the plating slurry. The negative electrode at this stage of fabrication, however, is too spongy to be the exact complement of the silver peroxide positive. While the exact nature of this silver peroxide positive may be varied somewhat by control of the sintering operation, control of current density during formation of the silver peroxide and control of the pressure under which the silver peroxide is compacted to affix it to its grid or mesh, the latitude of characteristics of positive plates is narrower than of the zinc negatives of this invention. In general, we consider it desirable to coordinate the variables of the fabrication of the positive plates to provide maximum physical strength and durability and desired electrolytic characteristics. Having developed a technique of fabricating a standard and satisfactory positive plate, the sponginess of the zinc plate is given a final adjustment after deposition of the predetermined amount of zinc in order to adjust or conform the sponginess of the negative to that of the positive.

This final adjustment of the sponginess of the negative is accomplished by compacting the individual negative electrodes after the water washing to a predetermined volume. In other words, the total weight of the metal of the electrodes has been accurately determined so that if this weight of metal is compacted to a predetermined volume, the sponginess or density is determined. This is accomplished by pressing the zinc plate in a press until its area and thickness conforms to the antecedent calculation of desired density. Such calculation may be made on the basis of theory or empirical tests, or both.

The fabrication of the negative or zinc electrode, therefore, comprises electro-plating metallic zinc from a slurry of zinc oxide in aqueous potassium hydroxide, periodically pressing to develop a spongy structure, water washing after a desired weight of zinc has been deposited, and then compacting the more spongy mass to a less spongy mass by reducing the volume of the former.

The silver peroxide electrode, as well as the zinc electrode, may be condensed by pressure to any desired density. Preferably, the silver peroxide positive electrode is compressed to a density of 60 to 80 grams per cubic inch, a density of 72 grams per cubic inch being particularly effective. The electroplated zinc negative electrode is compressed to a density of 20 to 40 grams per cubic inch, a density of 30 grams per cubic inch being advantageous and being complementary to the 72 grams per cubic inch density of the positive electrode. In general, the order of density of one electrode should vary with the density of the other within the ranges specified, but no exact mathematical relationship is requisite.

While a great variety of electrode separators or types of electrode separating diaphragms or materials may be used in the batteries of the type described, we prefer to employ at least two different separating diaphragms; (1) a bibulous pad, and (2) a less bibulous and more impervious dielectric. The bibulous pad may be constituted by a matted mass of cellulosic fibers which holds the required amount of electrolyte in position intermediate the electrodes. While this bibulous pad, itself, provides sufficient electrode separation for many purposes, there is some tendency of the cell to short circuit through the pad under some conditions.

We have discovered that such short circuiting between the electrodes is prevented if a dielectric sheet or diaphragm which is relatively dense in comparison with the bibulous pad is interposed between the electrodes. A suitable material is regenerated cellulose sheeting of the type used for sausage casing which may have a thickness of from 1 to 6 millimeters.

If the battery is a one-trip battery, that is, intended to discharge but once, this regenerated cellulose sheeting should be treated with caustic such as a 30 per cent aqueous potassium hydroxide solution, then washed in water and dried under tension to avoid wrinkling. Apparently the caustic reacts with the cellulosic material; at least it modifies the cellulosic structure to improve the characteristics of the battery. If, on the other hand, the battery is to be used as a storage battery, this pretreatment of the regenerated cellulose sheeting is not necessary and the desired alteration of the sheeting takes place in the presence of the caustic electrolyte.

For batteries which are discharged at high rates, the bibulous pad should be adjacent to the negative and the dielectric diaphragm adjacent to the positive. For batteries adapted to be discharged slowly over a long period, these positions may be reversed and, if desired, two bibulous pads may be used, one on each side of the dielectric diaphragm. The preferred separator of this invention is, therefore, a compound separator constituted by a relatively dense regenerated cellulose dielectric diaphragm and a bibulous pad of known or desired type.

The combination of porous electrodes and bibulous pad permits all of the electrolyte needed for operating the battery to be held by the electrodes and pad. This is a great advantage as it avoids spilling of the electrolyte and insures that a predetermined amount of electrolyte, but only a predetermined amount of electrolyte, is present and available for the electrolytic reaction.

The porosity of the zinc electrode is such that it is constituted by 65 to 83 per cent voids, and the silver peroxide electrode comprises 34 to 61 per cent voids. In general, the electrodes may have a thickness of up to 35 thousandths of an inch apiece, and the electrode separating materials may be as much as 40 thousandths of an inch thick. The regenerated cellulose separator may be 5 to 15 thousandths of an inch thick when dry, but the electrolyte swells it so that it will retain an amount of electrolyte which is two or three times as great as its dry volume.

Thus, by properly choosing the relative thickness and porosity of the electrodes and the electrolyte containing capacity of the electrode separating material, a proper amount of electrolyte may be incorporated within the gross volume defined by the electrodes and the electrode separating material. Further, the swelling of the regenerated cellulose electrode separating material insures a continuum of electrolyte between the two electrodes which provides low internal cell resistance.

The features described herein are conjointly contributory to the production of a light, powerful battery built around a highly efficient, but relatively inexpensive, silver peroxide positive electrode, a battery of the lightest possible weight and greatest possible dependability in relation to its ability to deliver current. By combining several or all of these features into a single battery, a commercial silver peroxide service battery having economic justification is accomplished.

Having described our invention, we claim:

1. In a primary battery of the zinc silver peroxide caustic type which is adapted to deliver uniform current continuously to substantially the full electrolytic capacity of the active chemicals which constitute the battery, a silver peroxide positive electrode which becomes increasingly spongy upon discharge, and a spongy zinc negative electrode constituted by electrolytically deposited zinc which has been physically compacted to increase its density to a predetermined degree, the density of said negative electrode being related to the sponginess of the structure of the positive electrode, so that the electrolytically active surfaces of the two electrodes have balanced electrolytic relationship to each other, and neither electrode carries substantially more chemically active material than necessary to insure substantial electrolytic exhaustion of the active chemical of the other electrode.

2. The method of making a primary battery of the zinc-silver peroxide caustic type which is adapted to deliver uniform current continuously to substantially the full electrolytic capacity of the active chemicals which constitute the battery, said method comprising the forming of the positive electrode by pasting silver peroxide upon a grid, sintering and reducing said silver peroxide on the grid to constitute a spongy mass of metallic silver, polarizing said silver electrolytically at low current density, and the forming of a negative electrode by electro-plating zinc upon a grid, then physically compacting the zinc so deposited to such a degree that its sponginess corresponds electrolytically to the sponginess of the positive electrode, whereby the active surface areas of the two electrodes bear the relationship to each other which provides optimum operating current densities for each.

3. The method of making a zinc negative electrode for a battery of the zinc-silver peroxide caustic type to match and balance electrolytically with a standard positive electrode, said method comprising depositing a predetermined weight of zinc electrolytically upon a grid, periodically interrupting said electrolytic deposition and physically compacting the deposited zinc, washing the electrolyte from the mass of spongy zinc so constituted, and finally compacting said predetermined weight of zinc to a predetermined degree of density, whereby its sponginess is reduced to provide an active internal surface area which balances functionally with the active internal surface area of the silver peroxide which constitutes the standard positive electrode.

4. In a silver peroxide zinc storage battery, a plurality of pairs of matched silver peroxide and spongy zinc electrodes, the mass of zinc electrodes being sufficient in relation to the mass of the silver peroxide electrodes to provide a residue of spongy zinc after the silver peroxide has been reduced to silver by discharge of the battery, whereby the battery may be recharged by replating the zinc back from the electrolyte onto the spongy residual zinc mass.

5. A silver peroxide zinc cell comprising a silver peroxide positive electrode constituted by silver peroxide attached to a grid, said electrode adapted to become porous as current is discharged from the cell, a complementary zinc electrode consisting of spongy metallic zinc affixed to a grid, said zinc electrode constituted by a single piece of zinc metal, the positive and negative electrodes having substantially the same overall face areas, the porosity of the zinc electrode being ionically complementary to that of the positive electrode, whereby the cell discharges to approximate exhaustion at a substantially uniform rate.

6. The method of making a zinc electrode for an electrolytic cell which comprises plating zinc upon a mesh grid from a slurry of zinc oxide in an aqueous caustic solution, interrupting said plating periodically and homogenizing the deposited zinc to provide a spongy mass of zinc affixed to the grid.

7. The method of making a zinc electrode for an electrolytic cell which comprises plating zinc upon a mesh grid from a slurry of zinc oxide in an aqueous caustic solution, interrupting said plating periodically and homogenizing the deposited zinc to provide a spongy mass of zinc affixed to the grid, and compacting the mass of spongy zinc to a predetermined degree to provide a desired porosity.

8. An electrolytic cell comprising a silver peroxide positive electrode and a zinc negative electrode, said silver peroxide electrode having a density of 3.65 to 4.9 grams per cubic inch, said zinc electrode having a density of 1.22 to 2.45 grams per cubic inch.

9. An electrolytic cell comprising a silver peroxide positive electrode and a zinc negative electrode, said silver peroxide electrode having a density of substantially 72 grams per cubic inch, said zinc electrode having a density of substantially 30 grams per cubic inch.

10. An electrolytic cell comprising a porous silver peroxide positive electrode, a porous zinc negative electrode and bibulous material separating said electrodes, the porosity of the silver peroxide positive electrode being sufficient to provide 34 to 61 per cent voids and porosity of the zinc electrode being sufficient to provide 65 to 83 per cent voids, the said electrodes and spacing material being adapted to hold an amount of electrolyte which is adequate for operating the cell.

11. An electrolytic cell comprising a porous silver peroxide positive electrode, a porous zinc negative electrode and bibulous material separating said electrodes, said material adapted to swell when wet with electrolyte, the porosity of the silver peroxide positive electrode being sufficient to provide 34 to 61 per cent voids and porosity of the zinc electrode being sufficient to provide 65 to 83 per cent voids, the said electrodes and spacing material being adapted to hold an amount of electrolyte which is adequate for operating the cell.

References Cited in the file of this patent

UNITED STATES PATENTS

| | | |
|---|---|---|
| 1,662,866 | Salazar | Mar. 20, 1928 |
| 1,895,397 | Pouchain | Jan. 24, 1933 |
| 2,317,711 | Andre | Apr. 27, 1943 |
| 2,594,709 | Andre | Apr. 29, 1952 |
| 2,594,711 | Andre | Apr. 29, 1952 |
| 2,594,713 | Andre | Apr. 29, 1952 |
| 2,610,219 | Yardeny | Sept. 9, 1952 |
| 2,624,767 | Moulton | Jan. 6, 1953 |